(12) United States Patent
Elam

(10) Patent No.: US 11,712,045 B2
(45) Date of Patent: Aug. 1, 2023

(54) COTTON CANDY TRUFFLES AND METHODS OF COATING COTTON CANDY WITH CHOCOLATE

(71) Applicant: Patricia Elam, Nolensville, TN (US)

(72) Inventor: Patricia Elam, Nolensville, TN (US)

( * ) Notice: Subject to any disclaimer, the term of this patent is extended or adjusted under 35 U.S.C. 154(b) by 0 days.

(21) Appl. No.: 17/176,380

(22) Filed: Feb. 16, 2021

(65) Prior Publication Data

US 2021/0259277 A1 Aug. 26, 2021

Related U.S. Application Data

(60) Provisional application No. 62/979,787, filed on Feb. 21, 2020.

(51) Int. Cl.
| | |
|---|---|
| *A23G 3/54* | (2006.01) |
| *A23G 1/54* | (2006.01) |
| *A23G 3/52* | (2006.01) |
| *A23G 1/30* | (2006.01) |
| *A23G 3/34* | (2006.01) |

(52) U.S. Cl.
CPC .............. *A23G 3/545* (2013.01); *A23G 1/305* (2013.01); *A23G 1/545* (2013.01); *A23G 3/0051* (2013.01); *A23G 3/0065* (2013.01); *A23G 3/52* (2013.01); *A23V 2002/00* (2013.01)

(58) Field of Classification Search
CPC ...... A23G 3/0051; A23G 3/0065; A23G 3/52; A23G 3/545; A23G 1/305; A23G 1/545
USPC ......................................................... 426/103
See application file for complete search history.

(56) References Cited

U.S. PATENT DOCUMENTS

| | | | | |
|---|---|---|---|---|
| 2,707,153 | A * | 4/1955 | Bettman | A23L 7/191 |
| | | | | 426/103 |
| 2015/0327569 | A1* | 11/2015 | Kessell | A23G 3/0027 |
| | | | | 426/103 |
| 2020/0068918 | A1* | 3/2020 | Rocha | A23G 9/42 |

FOREIGN PATENT DOCUMENTS

EP 1627569 A1 2/2006

OTHER PUBLICATIONS

Ken "Chocolate Covered Cotton Candy" dated Jun. 9, 2010 from Journal of a Hedonist (Year: 2010).*
Turkish Pismaniye Delight by Booboo candy; obtained from booboo-candy.com; Date verified by archive.org as Oct. 24, 2019. Document link: The Wayback Machine—https://web.archive.org/web/20191024105818/http://www.booboo-candy.com:80/product/pism . . . (Year: 2019).*
Chocolate-linguistics-part-4-truffles-vs Bon Bons, obtained from http://chocolateincontext.blogspot.com/2007/11/chocolate-linguistics-part-4-truffles-v.html; date posted Nov. 5, 2007; 4 pages (Year: 2005).*
Cotton candy synonyms (Year: 2021).*
Definition of Fluff obtained from Merriam Webster's Collegiate Dictionary—Tenth Edition—2001, p. 448 (Year: 2001).*
Cocoa Chocolate covered cotton candy by BooBoo : Turkish Pishmaniye Delights—dated Oct. 24, 2019 date verification by The Wayback Machine—https://web.archive.org/web/20191024105818/http://www.booboo-candy.com (Year: 2019).*

* cited by examiner

*Primary Examiner* — Jyoti Chawla
(74) *Attorney, Agent, or Firm* — United IP Counselors, LLC

(57) ABSTRACT

Truffles and other confections including cotton candy as a filling or as the outer shell of a filled confection are disclosed, as are methods of making such confections. In methods of making such confections, fresh cotton candy is shaped as needed, and then the shaped cotton candy is caused or allowed to form a thin crust of sugar that protects the inner mass of cotton candy from infiltration by chocolate or other coatings. The thin crust may be formed by a simple process, such as aging the formed cotton candy at appropriate conditions of temperature and humidity, or it may be formed by actively moistening the formed cotton candy. The resulting formed mass of cotton candy can be coated and finished. In some cases, shaped cotton candy may be formed around a filling and caused or allowed to form an outer crust, such that the cotton candy forms the outer layer of a truffle.

18 Claims, 6 Drawing Sheets

US 11,712,045 B2

COTTON CANDY TRUFFLES AND METHODS OF COATING COTTON CANDY WITH CHOCOLATE

TECHNICAL FIELD

The invention relates to confections, and more particularly, to confections that include cotton candy.

BACKGROUND

Cotton candy, a spun-sugar confection with a stranded, fluffy texture resembling that of cotton, is an enduring mainstay of the confectionary landscape in the United States and throughout the world. While ubiquitous at amusement parks and fairs, cotton candy today is made in a number of flavors and is enjoyed by an ever-larger cross-section of the public in a variety of settings.

Chocolate is another perennial favorite. Often eaten plain as a confection in its own right, chocolate is also widely used as a coating, covering, or ingredient in other sweets. A confection with a filling encased in an outer covering is often referred to as a truffle. Chocolate truffles, in which the filling is encased in chocolate, are among the most popular forms of truffle.

The nature and texture of cotton candy makes it difficult to use as a raw material in other types of confections, including truffles. For example, if one attempts to coat freshly-made cotton candy with chocolate to make a chocolate truffle, the chocolate may either infiltrate the strands, ruining the texture of the cotton candy, or melt the strands altogether. The result—however delicious it may be—is a mess, rather than a chocolate truffle.

SUMMARY OF THE INVENTION

Aspects of the invention relate to chocolate truffles with a cotton candy filling, and to methods for producing such truffles. More specifically, aspects of the invention relate to methods of producing a mass of cotton candy that can be reliably coated in chocolate and other such confections.

In a method according to one aspect of the invention, a mass of freshly-spun cotton candy is formed into a desired shape. After an initial shaping operation, the shaped mass of cotton candy is allowed to age for a period of time in ambient or semi-humid conditions. The sugar of the cotton candy is hygroscopic and absorbs moisture from the ambient environment both during forming and aging steps, forming a very thin crust of hydrated sugar that creates a barrier to infiltration of the liquid chocolate and also at least some protection against melting. After the aging period, the cotton candy may be re-shaped if necessary. If a crust has not formed because ambient humidity is too low, moistened hands or a dampened cloth may be used during re-shaping to create the necessary crust. Once a crust has formed, the cotton candy mass can be dipped in chocolate or otherwise coated with chocolate. In some embodiments, the cotton candy may be covered and sealed within a pre-formed shell, rather than being dipped or coated.

A mass of cotton candy may also be formed around a filling and then caused or allowed to form a crust, as described above. In these cases, the cotton candy may serve as the outer shell of a truffle or other confection, or it may be dipped in chocolate or other such confections.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
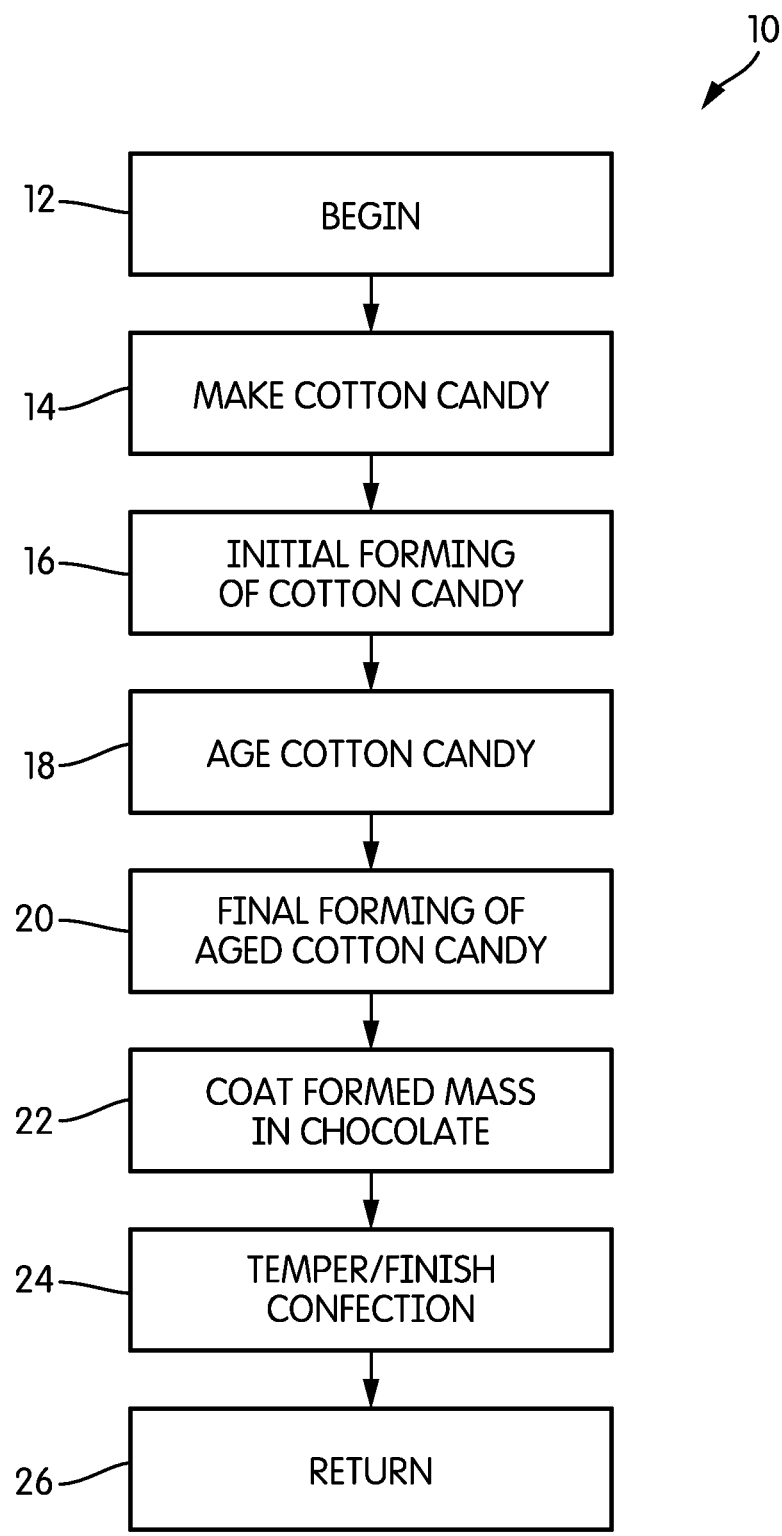
FIG. 1 is a schematic flow diagram of a method for making a chocolate truffle with a cotton candy filling according to one embodiment of the invention.

FIG. 1 is a schematic flow diagram of a method, generally indicated at 10, for preparing cotton candy to be used as a raw material in other types of confections. While much of the description below will focus on the preparation of cotton candy for use with chocolate, and specifically, as a filling for a chocolate truffle, cotton candy prepared according to method 10 may be used in other types of confections as well. Method 10 begins at task 12 and continues with task 14.

In task 14, cotton candy is manufactured using traditional techniques. This usually involves using a machine that uses heat and centrifugal force to melt sugar and spin it into strands. For example, the machine may be a X-15A Whirlwind, which is manufactured by Gold Medal of Cincinnati, Ohio. The cotton candy may be removed from the machine using the hands, a cone, a stick, or in any other convenient way. Traditional and non-traditional colorings and flavors may be added to the cotton candy during manufacture.

Figure 2:
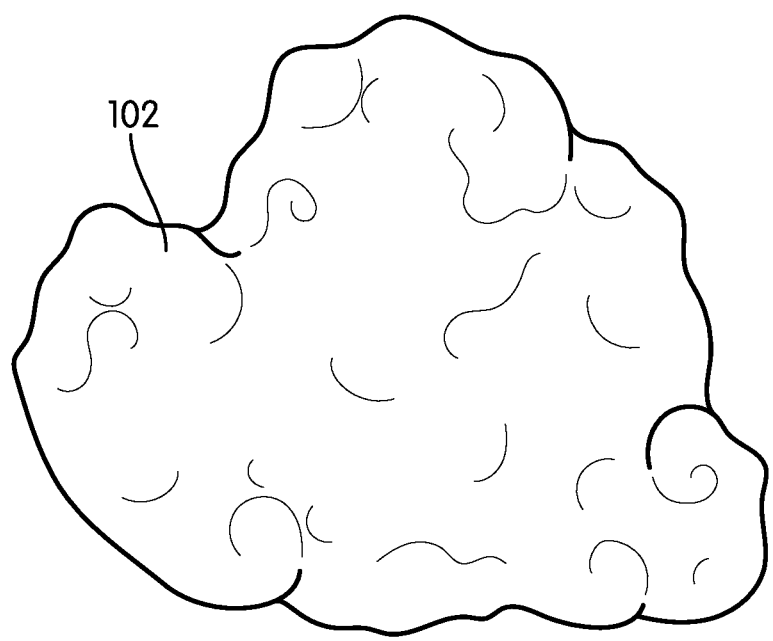
FIG. 2 is a perspective view of an unformed mass of cotton candy.

An initial mass of cotton candy 102 is shown in the perspective view of FIG. 2. When just made, cotton candy is typically amorphous in overall shape, with the tufted, billowing quality that gives it its name. The particular mass or volume of cotton candy that is necessary in task 14 will depend on the size and nature of the confection that is to be made. Typically, the volume of cotton candy that is made in task 14 will be larger than the expected volume of cotton candy that is needed in the finished confections. While method 10 is intended to preserve the texture of the cotton candy and to keep it fluffy, the forming tasks described below may compress it somewhat, resulting in some reduction of volume. Cotton candy for several truffles or confections may be made at the same time. Method 10 continues with task 16.

In task 16 of method 10, the fresh cotton candy is subjected to an initial forming step. If the object is to produce a chocolate truffle with a cotton candy filling, the initial forming step of task 16 would typically involve forming the cotton candy into a spherical or rectilinear shape, although other shapes are possible. For example, chocolate truffles are often made in more fanciful shapes—animals, plants, stars, hearts, etc., and the cotton candy may be formed into any of those shapes, or others, for later coating or other processing. Task 16 may involve hand pressing and rolling, machine pressing and rolling, and other operations, like cutting and stamping, particularly if the cotton candy is to be made in a shape other than spherical. In forming the cotton candy, care should be taken to moderate the forces and pressures involved, so that the cotton candy retains its characteristic fluffiness. For a typical round-type chocolate truffle, a formed ball of cotton candy may be on the order of 1-1.25 inches (2.5-3.2 cm). Larger truffles, e.g., on the order of 1-5-2.5 inches or greater, may be made.

Figure 3:
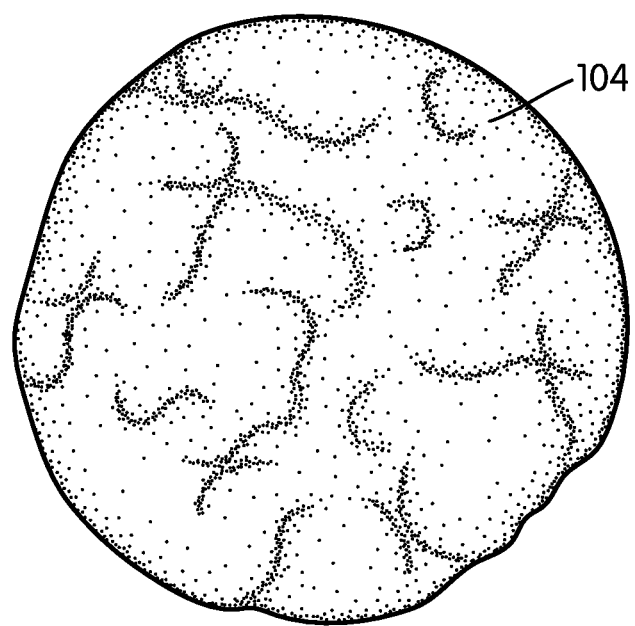
FIG. 3 is a perspective view of a formed mass of cotton candy, showing a light crust on the outer surface.

Once the cotton candy has been subjected to an initial forming step or steps, method 10 continues with task 18. In task 18, the formed cotton candy is aged for a period of time, typically on the order of 10-20 minutes, under appropriate conditions of temperature and humidity. Task 18 of method 10 relies on the fact that the sugar in the cotton candy is hygroscopic; given time, it will absorb moisture from the air around it. The absorption of moisture will partially hydrate the sugar, forming a very thin outer crust. Once again using a spherical shape as an example, a formed ball of cotton candy 104 with such a thin crust is shown in the perspective view of FIG. 3. The presence of the crust is typically visible to the naked eye; the cotton candy may appear slightly glossy and slightly smoother than unaged formed cotton candy. As those of skill in the art will understand, the kind of brief aging described here is only one way in which to form a thin outer crust on the cotton candy. Other methods of causing or allowing such a crust to form may also be used in embodiments of the invention. In other embodiments, task 18 could be used for an active moistening process to form a thin crust on the cotton candy, e.g., by brief exposure to a water mist.

Appropriate conditions of temperature and humidity typically involve room temperature or just below—66-68° F. (19-20° C.) and ambient humidity. As shown in FIG. 1, task 20 of method 10 often involves a second, final forming of the aged cotton candy. If the ambient humidity levels are not high enough to produce the thin crust by the end of a brief aging period, during this final forming task, the cotton candy may be rolled or formed with moist hands or otherwise exposed to a higher level of moisture. As those of skill in the art will appreciate, the level of moisture should not be so high that the sugar of the cotton candy begins to dissolve in bulk.

In some embodiments, task 20 may be unnecessary; if the cotton candy forms a crust by the end of the aging period in task 18, it may not be necessary to perform further forming tasks.

Once an appropriate crust has formed, the cotton candy can be coated with chocolate, as indicated by task 22 of method 10. This is typically done in a temperature range in which the chocolate is in temper, e.g., 85-90° F. (29-32° C.). However, the chocolate may be at any temperature so long as it is not so hot that it begins to melt the cotton candy. The thin crust that has formed on the cotton candy prevents infiltration of the chocolate into the body of the cotton candy and may also provide a modicum of protection against melting.

In task 22, or at any time prior to coating, a stick or another such part may be inserted into the cotton candy. In other words, while this description uses the word "truffle" to describe filled chocolates, that term should be read broadly enough to encompass cotton candy confections with other form factors. For example, prior to coating, a stick could be inserted in order to give the finished confection the form of a lollipop, popsicle, or ice cream bar.

Figure 4:
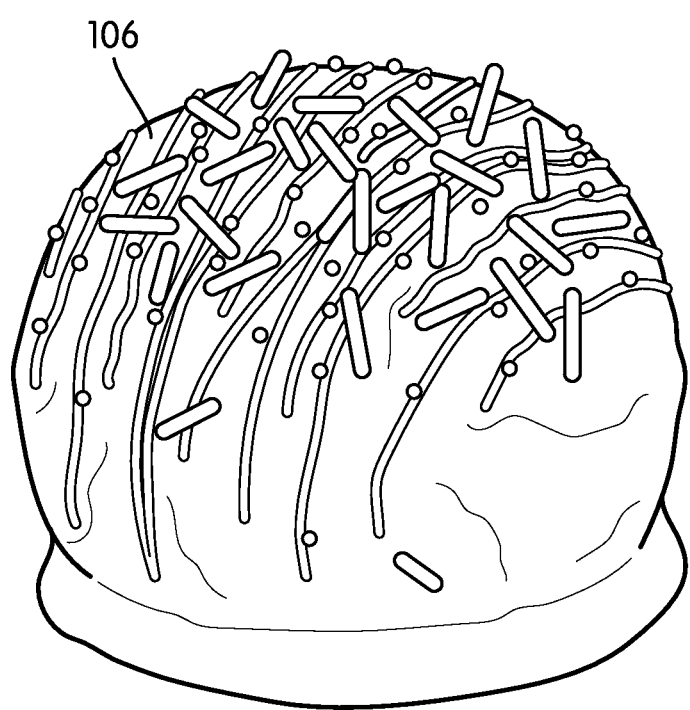
FIG. 4 is a perspective view of a finished chocolate truffle with a cotton candy filling.
Figure 5:
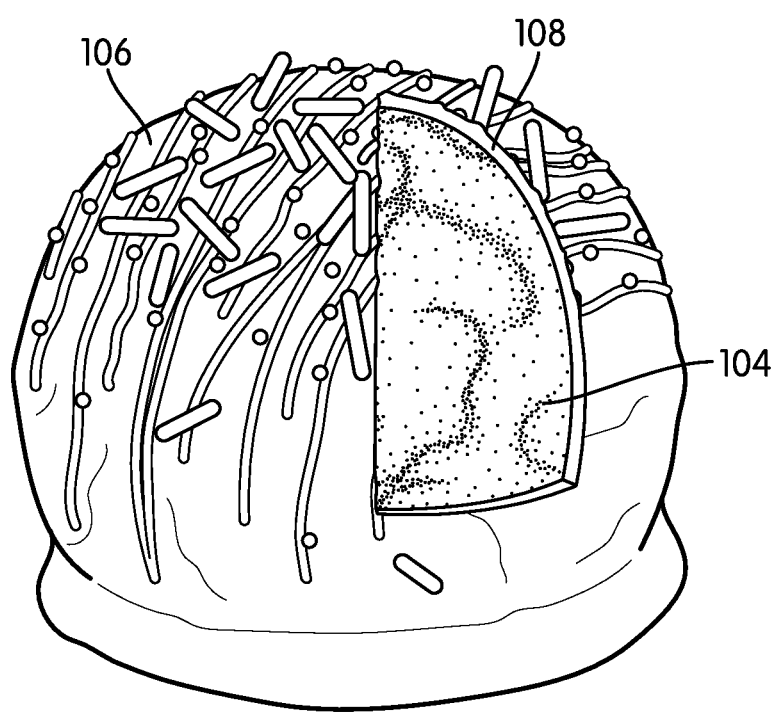
FIG. 5 is a perspective view of the finished chocolate truffle of FIG. 4 with a portion of the chocolate covering removed to show the cotton candy filling.

While the term "chocolate" is used here, chocolate-flavored substances and ganaches may be used, as may white chocolates and other typical confectionary encapsulants. FIG. 4 is a perspective view of a finished truffle 106, and FIG. 5 is a similar perspective view of the truffle 106 with part of the coating 108 cut away to reveal the encrusted cotton candy 104 within. Ideally, the crust on the cotton candy 104 is so thin that it is imperceptible or almost imperceptible when the truffle 106 is eaten, and the cotton candy 104 retains its fluffy texture. Here, the phrase "retains its fluffy texture" indicates that the cotton candy 104, although it may be compressed somewhat during the formation process, is still recognizably cotton candy and is not compressed, wetted, or otherwise altered to the point where the majority of sugar strands fuse. Method 10 continues with task 24.

Also notable in FIG. 5 is the fact that in the truffle 106, the coating 108 is a separate and distinct layer from the cotton candy 104. At least in part because the cotton candy 104 is very lightly encrusted, the outer covering 108 and the cotton candy 104 do not intermingle significantly. In most cases, the outer covering 108 can be pulled away from the cotton candy 104 with relative ease and only a few wisps of cotton candy 104 stuck to its inner side.

Task 24 of method 10 is a general task that encompasses any tasks that may be needed to finish the chocolate truffle or other confection after coating with chocolate. During task 24, the chocolate may be tempered, decorated, or other steps taken. The precise tasks performed in task 24 will depend on the nature of the confection that is being made. Method 10 is complete and returns at task 26.

Figure 6:
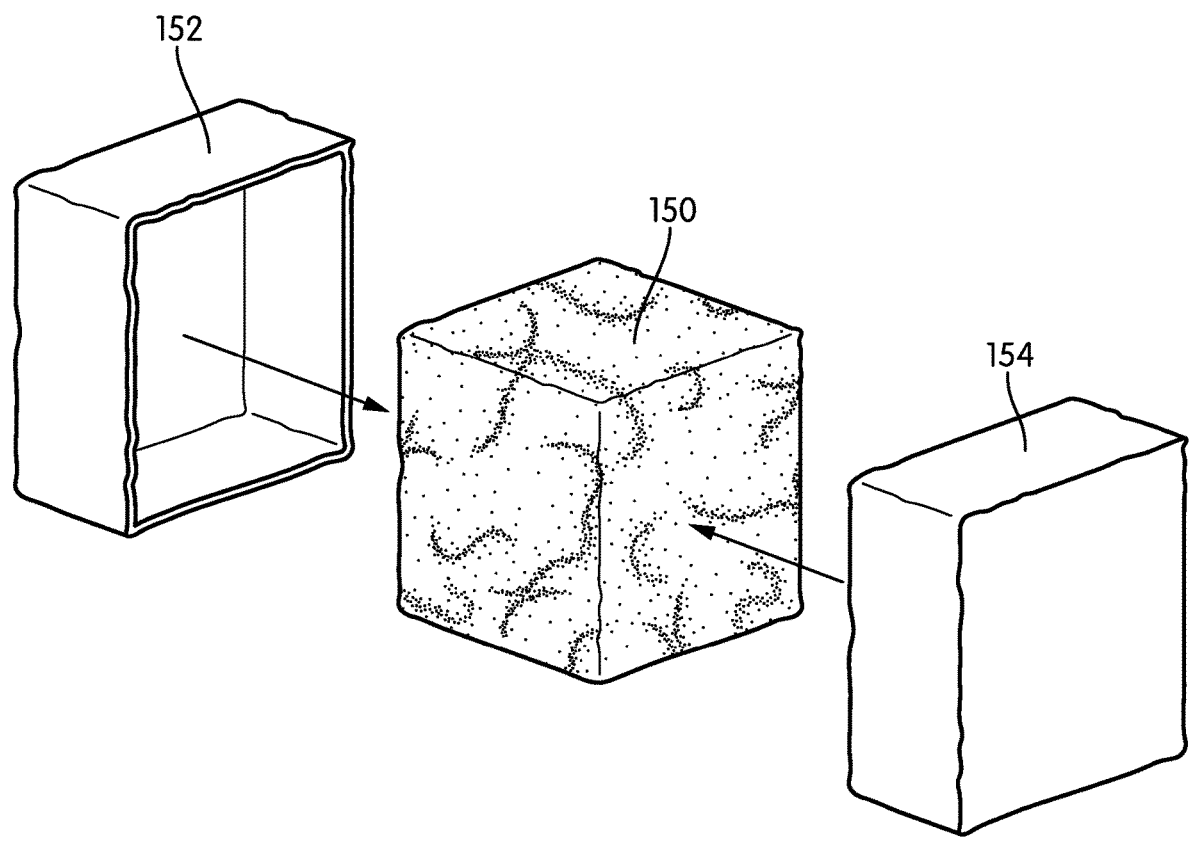
FIG. 6 is a perspective view illustrating a method of covering a mass of cotton candy with chocolate using pre-formed chocolate shells.

As was noted briefly above, the confection may be of any number of types, and it may be made in any number of shapes. FIG. 6 is an exploded perspective view of a confection, generally indicated at 150, according to another embodiment of the invention. The confection 150 is generally rectilinear in overall shape.

FIG. 6 illustrates another aspect of the invention as well: while many portions of this description refer to dipping the cotton candy mass into melted chocolate to coat it, there are other ways in which the cotton candy mass may be covered with chocolate. In FIG. 6, formed cotton candy 150 with a rectilinear shape is covered by two pre-formed chocolate shells 152, 154 that are placed over it and sealed together. The resulting seam between the shells 152, 154 can be sealed by heating, confectionary glue, or some other mechanism. In FIG. 6, the shells 152, 154 are mirror images of one another, but that need not be the case in all embodiments. In other cases, the shell may be complete save for one panel. For example, if the final confection is to have the shape of a star, the shell could be in a star shape, with only a flat back or bottom panel missing. It is also possible that multiple covering techniques could be used in making a single confection. For example, formed cotton candy 150 may be placed in one shell 152 and dipped in melted chocolate to complete the covering.

Although this description largely focuses on chocolate as the outer covering of a confection that includes cotton candy, in some cases, the cotton candy itself may be the outer covering. This would typically be done by forming the cotton candy around a filling, and then aging the cotton candy as described above with respect to task 18 of method 10 to develop a very thin crust of sugar as an outer protectant. The finished confection would have an outward appearance much like the aged cotton candy 104 of FIG. 3.

Figure 7:
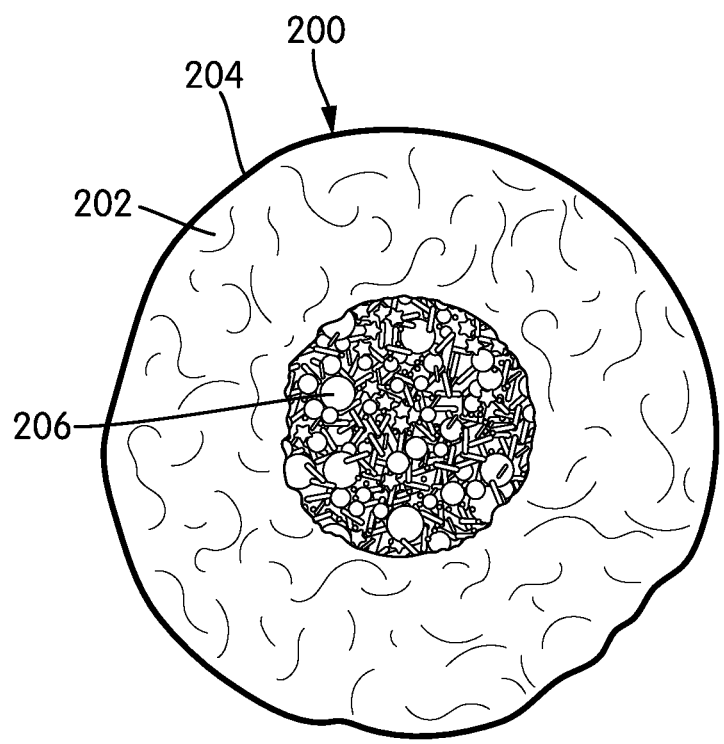
FIG. 7 is a cross-sectional view of a cotton candy truffle in which the cotton candy is the outer layer.

FIG. 7 is a cross-sectional view of a confection, generally illustrated at 200, that includes an outer layer of cotton candy 202. The outer layer of cotton candy has a thin shell 204 of hydrated sugar formed by aging the cotton candy as described above; the outer layer of cotton candy 202 otherwise retains its typical fluffy texture, although it may be somewhat compressed during formation.

Within the outer layer of cotton candy 202, a filling 206 is present. In the illustrated embodiment, the filling 206 comprises edible glitter, although a wide variety of other types of confections may be used. Chocolate powder, marshmallows, and hard candies are all possible elements that may be used as a fill. While the nature of the fill is not particularly limited, it may be helpful to avoid particularly wet or hygroscopic confections that could have a deleterious effect on the cotton candy 202.

One advantage of using cotton candy 202 as the outer layer of the confection is that the cotton candy is relatively easily dissolved in water and other beverages. Thus, for example, the finished confection 200 may be placed in a glass of champagne, milk, hot chocolate, tea, coffee, or some other beverage and allowed to dissolve, sweetening the beverage and eventually releasing the filling 206 into the glass.

While the invention has been described with respect to certain embodiments, the description is intended to be exemplary, rather than limiting. Modifications and changes may be made within the scope of the invention, which is defined by the appended claims.

What is claimed is:

1. A truffle with a cotton candy filling, comprising:
   a formed mass of cotton candy, including an outer crust comprising a thin, hydrated layer thereof on an outer surface thereof; and
   a confectionary coating over the crust, such that the crust is interposed between and forms a barrier between the confectionary coating and portions of the formed mass of cotton candy inside of the crust;
   wherein the cotton candy remains fluffy within the truffle.

2. The truffle of claim 1, wherein the truffle is a chocolate truffle.

3. The truffle of claim 1, wherein the truffle has a distinct layer of outer coating.

4. The truffle of claim 3, wherein the distinct layer of outer coating comprises a chocolate layer.

5. The truffle of claim 1, wherein the formed mass of cotton candy resembles the shape of an animal, a plant, a star, or a heart.

6. A method of preparing a cotton candy truffle, comprising:
   forming a mass of cotton candy into a predefined shape;
   causing or allowing a sugar crust to form overtop of the mass of cotton candy as a thin, hydrated layer thereof; and
   coating the encrusted cotton candy mass with a confectionary coating to form the truffle with the sugar crust interposed between and forming a barrier between the confectionary coating and portions of the formed mass of cotton candy inside the crust, whereby the encrusted cotton candy remains fluffy within the truffle.

7. The method of claim 6, wherein the cotton candy truffle is a chocolate cotton candy truffle.

8. The method of claim 6, wherein said causing or allowing comprises aging the formed mass of cotton candy under conditions of temperature and humidity that cause the outer surface thereof to absorb moisture.

9. The method of claim 8, wherein said causing or allowing further comprises moistening an outer surface of the mass of cotton candy.

10. The method of claim 6, wherein said causing or allowing comprises aging the formed mass of cotton candy under conditions of temperature and humidity that cause the outer surface thereof to absorb moisture.

11. The method of claim 6, wherein the predefined shape is rounded or rectilinear.

12. The method of claim 6, wherein the predefined shape resembles the shape of an animal, a plant, a star, or a heart.

13. A method of preparing a cotton candy truffle, comprising:
   forming a mass of cotton candy into a predefined shape around a filling; and
   causing or allowing a sugar crust to form overtop of the mass of cotton candy as a thin, hydrated layer thereof.

14. The method of claim 13, wherein the filling comprises a confection.

15. The method of claim 14, wherein the confection comprises edible glitter.

16. The method of claim 13, wherein the cotton candy comprises an outer shell of the cotton candy truffle.

17. The method of claim 13, further comprising:
   coating the encrusted cotton candy to form the truffle.

18. The method of claim 13, wherein said formed, encrusted mass of cotton candy retains inner fluffiness.

* * * * *